July 10, 1951  V. N. TRAMONTINI  2,559,810
HEATING SYSTEM CONTROL

Filed April 10, 1946  2 Sheets-Sheet 1

Inventor:
Vernon N. Tramontini
By: Williams, Bradbury & Hinkle
Attorneys.

July 10, 1951
V. N. TRAMONTINI
2,559,810
HEATING SYSTEM CONTROL
Filed April 10, 1946
2 Sheets-Sheet 2
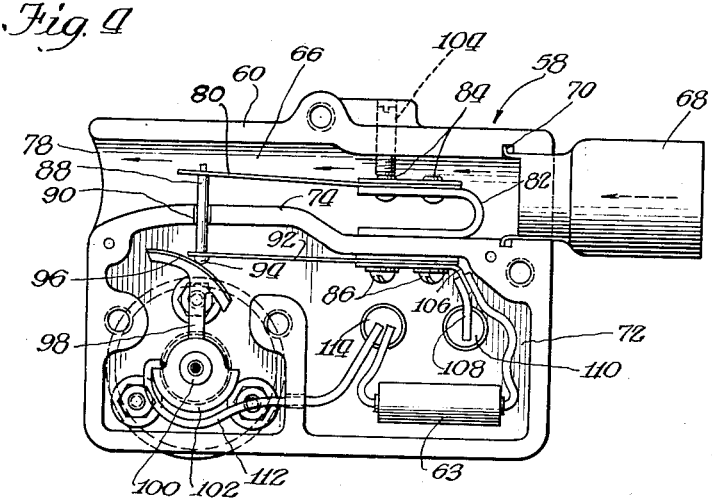
Inventor:
Vernon N. Tramontini,
By: Williams, Bradbury & Hinkle
Attorneys.

Patented July 10, 1951

2,559,810

UNITED STATES PATENT OFFICE 2,559,810

HEATING SYSTEM CONTROL

Vernon N. Tramontini, Indianapolis, Ind., assignor to Stewart-Warner Corporation, Chicago, Ill., a corporation of Virginia Application April 10, 1946, Serial No. 661,097

3 Claims. (Cl. 237—2)

The present invention relates to heating systems and, more particularly, to a heating system and control mechanism therefor particularly adapted for use in heating and ventilating automotive vehicles, although the system may be applied to other heating purposes.

One of the objects of the present invention is to provide an improved heating system for an automotive vehicle or the like, such that the heat output of the system is modulated to maintain a constant temperature within the space to be heated without the necessity for on and off cycles.

A further object of the present invention is to provide an improved heating system for accomplishing the above and which is so arranged that the heat output of the system is high when the temperature within the space to be heated is low so as quickly to raise the temperature within the space to a satisfactory level, the heating system subsequently reducing its heat output as the temperature within the space approaches the satisfactory level.

Yet another object of the present invention is to accomplish the above fully automatically.

Still another object is to accomplish the above by a novel heating system which cycles rapidly between high and low heat output so as to maintain a mean average duct temperature which varies depending upon the temperature within the space to be heated.

Still another object of the present invention is to accomplish all of the above simply and at comparatively low cost.

Other objects and advantages will become apparent from the following description of a preferred embodiment of my invention which is illustrated in the accompanying drawings.

In the drawings, in which similar characters of reference denote similar parts throughout the several views:

Fig. 4 is a back view of the device illustrated in Fig. 2 with the cover plate removed so as to disclose the interior mechanism;

Fig. 5 is a front view of the device illustrated in Figs. 2 and 4; and

Fig. 6 is an electrical circuit diagram of the control system including the controller illustrated in detail in Figs. 2 to 5.

Figure 1:
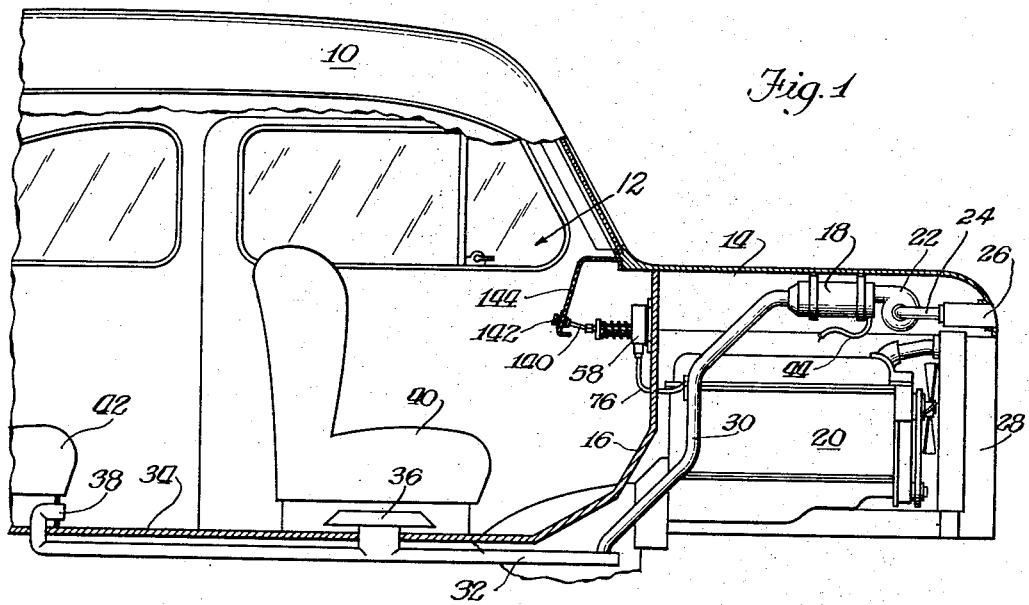
Fig. 1 is a diagrammatic illustration of an automobile, partly in longitudinal section, showing the layout of a typical heating system, controller, and control system comprising the present invention.

The present invention may be considered as an improvement, at least for certain purposes, over the device described and illustrated in the copending application of Vernon N. Tramontini for "Heater Controls," Serial No. 633,733, filed December 8, 1945, now Patent No. 2,481,630.

The invention is illustrated in connection with an automobile 10 provided with a driver's compartment 12 separated from the engine compartment 14 by a dash 16. Within the engine compartment, the heater 18 is located in a position above the engine 20 and is provided with a blower 22 on its inlet side. The inlet of the blower is connected by means of a duct 24 to a ram or air inlet opening 26 located behind the radiator grill in a position above the radiator 28.

The air outlet end of the heater is connected to a ventilating air duct 30 which extends rearwardly and downwardly to a longitudinally extending duct 32 arranged beneath the floor 34 of the vehicle. This duct is provided with outlets 36 and 38 located respectively beneath the driver's seat 40 and the rear seat 42. A fuel line 44 is connected to the heater in such manner that the fuel under pressure passes through an on-and-off solenoid valve 46 and thence through a restricting solenoid valve 48 before arriving at the heater. These valves are so constructed that when the valve 46 is de-energized, it is in closed position and no fuel is permitted to flow therethrough, while when this valve is energized, fuel in adequate quantity to operate the heater at the high heat output level is permitted to flow. Valve 48 is so constructed that when deenergized and therefore closed it leaks a sufficient quantity of fuel to operate the heater at the low heat output level. When this valve is energized, it opens and offers substantially no restriction to the flow of fuel therethrough. It is apparent, therefore, that so long as the valve 46 is de-energized, the heater will not operate. When both valves are energized, the heater will operate at its high output and when valve 46 is energized and valve 48 de-energized, the heater will operate at the low heat output rate.

Referring to Fig. 6, it will be seen that the automobile battery 50 supplies electric power through the heater on-and-off switch 52 to three thermostatic switches 54, 56 and 58, and the motor 53 for the blower 22. Of these switches, switch 54 is connected to a hot wire igniter 59 of the heater 18, the other end of the igniter being grounded. Thermostatic switch 56 is connected to one terminal of the on-and-off solenoid valve 46, the other terminal of this valve being grounded, while the thermostatic switch 58 is similarly connected to the restricting solenoid valve 48. In order to prevent sparking at the contacts of the thermostatic switch 58, this switch is shunted by a capacitor 63.

The switches 54 and 56 are arranged closely adjacent the heater at the hot air outlet end, so that they will be sensitive to the temperature of the air leaving the heater.

When switch 52 is closed, if the heater has not been operating recently, the switches 54 and 56 will be closed, and thus the igniter 59 is energized and quickly comes up to ignition temperature. Also the solenoid valve 46 will be opened, thereby permitting fuel to flow to the heater. Soon after combustion is well established, the temperature of the outlet air from the heater will rise sufficiently to open the switch 54 and de-energize the igniter 59. The purpose of the switch 56 is to serve as an overheat safety control so as to shut off the fuel supply completely if the temperature of the air leaving the heater becomes excessively hot as might occur if the blower 22 fails to operate. The switch 58 operates as will be described presently to cycle the heater between the high heat output position and the low heat output position as required to maintain a comfortable temperature within the automobile.

A heater of the above-described type suitable for use with the control system here described is illustrated and described in Patent No. 2,507,081 granted to George W. Allen and Vernon N. Tramontini. A typical heater of this type may have a high heat output of approximately 20,000 to 25,000 B. t. u. per hour and a low heat output under reduced fuel conditions of something like 4,000 to 5,000 B. t. u. Under normal conditions, 4,000 to 5,000 B. t. u. is not sufficient to keep the occupants of an automobile warm excepting in extremely mild weather, particularly when all of the air to be heated is brought in from the outside rather than being recirculated. On the other hand, 20,000 B. t. u. is more than is necessary for continuous operation, even in severe weather, but such high heat output is an advantage in that it permits the automobile to be heated quickly to a comfortable temperature even in cold weather.

The present invention is concerned primarily with the switch 58 and the heater control system in which it is included.

The switch 58 comprises a case 60 molded preferably of some plastic material, such as "Bakelite," for instance. It is generally rectangular and is flat on one side while the other side is cored out, as will be described presently, this latter cored side being closed by a flat metal cover plate 62 having ears 64 which serve as mounting brackets for the device. As best illustrated in Fig. 4, the cored side of the case element 60 provides a recess 66 which together with the cover 62 forms a passage completely through the case from right to left, as seen in Fig. 4. At the right hand end, this passage communicates with an adapter 68, the inner end of which is spun into an annular recess in the case as at 70 or, if preferred, the adapter 68 may be molded into the case at the time the case is formed. Directly beneath the passage 66, the case is provided with a recess 72 which is closed by the cover 62 and houses a portion of the operating mechanism. The recesses 66 and 72 are separated by a partition 74.

The adapter 68 is connected to a tube 76 formed of a material of low thermal conductivity and this tube extends through the dash 16 into the engine compartment 14 and terminates with its end within the heater duct 30. Preferably the tube 76 should extend within the duct 30 in a direction toward the heater and into a position comparatively close to the heater so that the total pressure (static and dynamic) within the heater duct will be effective to force air through the tube 76. Also, to prevent heat loss and to obtain better control, the duct 30 should be formed of a material of low thermal conductivity or should be insulated with asbestos, glass wool, or the like.

Hot air from the heater 18 passes into the duct 30 and a portion of this air is picked up by the tube 76 and carried to the controller 58 where it enters through the adapter 68. It flows through the passage 66 and leaves the controller at an outlet opening 78.

Within this package a bimetal blade 80 is secured at one end to a U-shaped bracket 82 by means of rivets 84 and the bracket in turn is attached to the partition 74 by means of screws 86. The free end of the bimetal blade 80 is connected to a pin 88 at right angles thereto which extends downwardly through a hole 90 in the partition 74 and into the space 72. At its lower end the pin is connected to a spring metal blade 92 which is arranged parallel to the bimetal blade 80 and is secured at its opposite end by the same screws 86 which secure the U-shaped bracket 82. Changes in temperature of the air flowing through the passage 66 cause the bimetal blade to bend downwardly when the temperature decreases and to move upwardly when the temperature increases. The pin 88 follows the free end of the bimetal blade 80, while the spring metal strip 92 keeps the pin 88 in alignment so that it does not wobble from side to side. The extreme lower end of the pin 88 in a position beneath the strip 92 carries an electric contact 94 which co-operates with an arcuate cam-shaped contact 96 attached to a spoke 98 secured to a rotatable shaft 100. In order to make the device less sensitive to vibration, it is preferable that the contact strip 96 and spoke 98 be counterbalanced by means of a weight 102 located on the opposite side of shaft 100.

As seen in Fig. 4, as the shaft 100 rotates in a counter-clockwise direction, the spoke 98 and the cam-shaped contact element 96 will be swung toward the left so that the contact 94 will move downwardly a greater distance before it makes contact with the strip 96. Conversely, rotation of the shaft in the opposite direction moves the contact strip 96 toward the right so that the contacts 94 and 96 are brought together at a higher position. So as to adjust the starting position of the bimetal blade 80, a slotted set screw 104 is threaded through the top of the case 60 in such position that its lower end comes against one of the rivets 84 which attaches the bimetal blade 80 to the U-shaped bracket 82. Thus, by adjusting the screw 104 downwardly the fixed end of the bimetal blade 80 can be moved downwardly. Conversely, moving the screw 104 upwardly raises the fixed end of the bimetal blade because the U-shaped bracket 82 has sufficient springiness to cause its free end to follow the end of the screw.

Electric circuit connections to the switch are made on the one hand by way of contact 94, strip 92 and a clip 106 secured beneath the heads of the screws 86 to a wire 108 which leads to a terminal post 110 extending through the side wall of the case. On the other hand, the circuit leads from the cam-shaped contact element 96 through the spoke 98 to the hub portion adjacent the shaft 100 and thence through a pigtail lead 112 to a second terminal post 114 extending through the wall of the case in a position adjacent the terminal 110. Preferably to prevent arcing of the contacts 94 and 96, the capacitor 63 previously mentioned is connected across the terminals 110 and 114, the capacitor being housed within the space 72.

Figure 2:
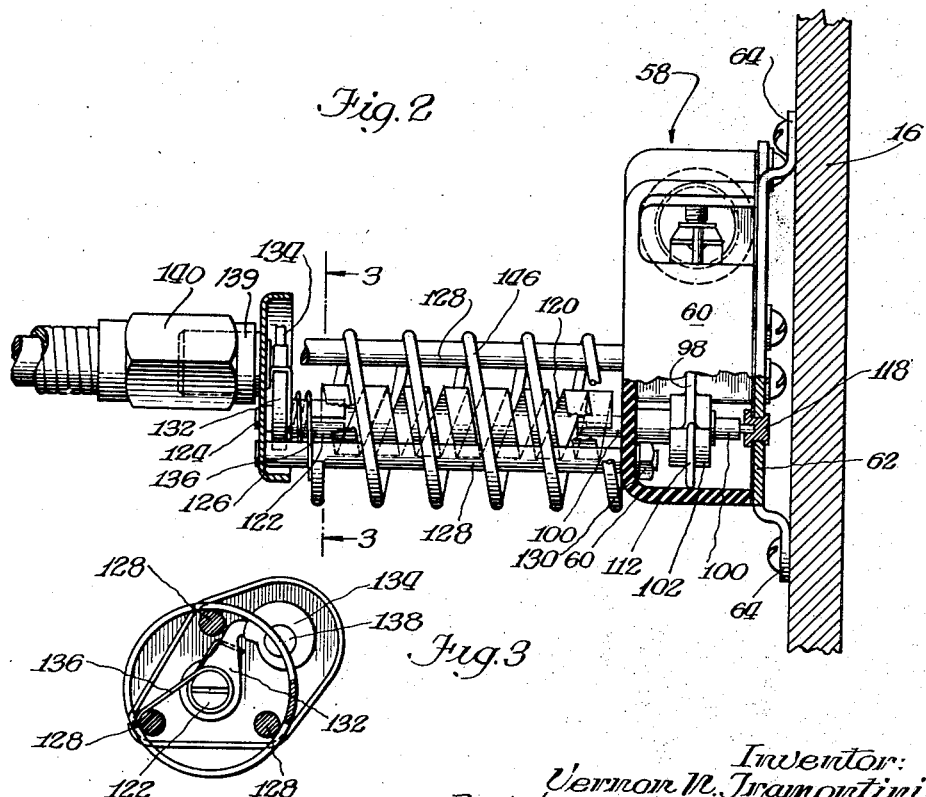
Fig. 2 is a side view of the controller with portions thereof broken away better to illustrate the mechanism.

By reference to Fig. 2, it will be seen that the shaft 100 is journaled at one end in a bearing 118 secured in the cover plate 62. At its opposite end, the shaft 100 projects through the opposite wall of the case 60 and is attached to one end of a helical bimetal strip 120 which extends away from the case in a direction at right angles thereto and is secured at its opposite end to a stub shaft 122 journaled at its end 124 in a plate supported at the ends to three posts 128 which are attached at their opposite ends to the case 60 by means of nuts 130.

Figure 3:
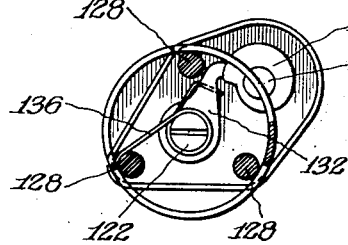
Fig. 3 is a sectional view in a vertical plane which may be considered as taken in the direction of the arrows along the line 3—3 of Fig. 2.

As best seen in Fig. 3, the stub shaft 122 carries a cam-following arm 132 extending at right angles thereto. The end of the cam follower engages the periphery of a spiral cam 134. It is biased in this direction by one end of a grasshopper spring 136 coiled around the shaft 122 with its opposite end hooked over one of the posts 128. The cam 134 is mounted upon the end of a short shaft 138 journaled in a bushing secured to the plate 126 and is equipped at its opposite end with an adapter 139 for attachment to a flexible shaft drive 140. This flexible shaft drive may be of the ordinary speedometer type and leads to a control knob 142 mounted upon the instrument panel 144 within easy reach of the driver.

In order to protect the bimetal element 120, a loose coil 146 of comparatively stiff wire is wound around the outside of the posts 128 and is secured thereto in any suitable manner, such as by spot welding.

The device operates in the following manner. If it is assumed that the automobile has remained out of doors in cold weather until the temperature within the compartment is well below the comfort level, the bimetal element 120 which projects freely into the space to be heated will be cooled to space temperature and its characteristics are such that under these conditions it rotates the cam-shaped contact element 96 in a clockwise direction, as seen in Fig. 4. The higher portion of the contact 96 is therefore brought against the contact 94 which is moved under the influence of the bimetal strip 80.

If the heater is started under these conditions, the restricting solenoid valve 48 will be energized, since the contacts 94 and 96 are together, with the result that the heater operates at high heat so as to deliver to the driver's compartment fresh air to which approximately 20,000 to 25,000 B. t. u. per hour is added. The temperature of the air introduced into the automobile through the openings 36 and 38 is therefore quite high and raises the temperature of the interior of the vehicle at a rapid rate. A portion of this hot air is by-passed through the tube 76 and through the passage 66 of the controller and raises the temperature of the bimetal blade 80, thereby tending to cause it to deflect upwardly. Since the highest portion of the cam-shaped contact element 96 is against the contact 94, it will be seen that the bimetal strip 80 is bent upwardly at its free end sufficiently by the contact 96 so that the temperature of the air flowing through the passage 66 must necessarily be very high before the bimetal blade 80 will deflect enough to pull the contact 94 away from the contact 96. Whenever it does pull the contacts apart, the heater drops to low heat output, thereby reducing the temperature of the air through the duct 30 and through the passage 66 with the result that the bimetal element 80 soon deflects downwardly again and brings the contact 94 against the contact 96, thereby shifting the heater back to high heat operation. Normally, these cycles will take place quite rapidly with the result that the temperature of the air passing through the duct will not vary more than something on the order of ten degrees.

As the temperature within the automobile rises toward a satisfactory level, the helical bimetal element 120 sensitive to this temperature will rotate the cam-shaped contact 96 in a counter-clockwise direction, thereby bringing a lower portion of the contact 96 into operative relationship with the contact 94. It is apparent, therefore, that the strip 80 will bend sufficiently to pull the contact 94 away from the contact 96 at a lower temperature within the passage 66. The controller, therefore, causes the high and low cycles of the heater to be so adjusted in length that the temperature of the air passing through the duct 30 to the interior of the vehicle decreases.

As the temperature within the driver's compartment continues to rise, the contact element 96 is swung more and more toward the left until when a satisfactory temperature has been reached the heater will cycle between high and low at a proper rate to maintain the desired temperature. The device is preset to the temperature desired by rotating the knob 142 which rotates the cam 134 by way of the flexible shaft 140 and shaft 138, as can be seen from Fig. 2 and Fig. 3. Movement of the cam 134 rocks the arm 132 in a clockwise or counter-clockwise direction, thereby pivoting the shaft 122 so as to determine the starting position of the helical bimetal element 120.

In order to maintain the temperature within the automobile body substantially contant and to obtain maximum heat output while the automobile is being heated from a cold starting condition without overheating, it is desirable that the temperature of the bimetal coil 120 have more effect upon the restricting magnetic valve circuit than the temperature of the air in the duct 30. I have found a good compromise to be one such that one degree of temperature variation of the helical bimetal element 120 will have approximately the same effect upon the contacts 94 and 96 as ten degrees of temperature variation of the bimetal strip 80. In other words, ten degrees of variation in the temperature of the bimetal strip 80 should produce approximately the same amount of motion of the contact 94 as one degree change in the temperature of the coil 120 will produce in the vertical component of movement of the cam-shaped contact element 96.

From the above description of a preferred embodiment of my invention it is apparent that the heat output, or, in other words, the mean average temperature of the air in the duct 30, will decrease as the temperature within the car body rises toward a comfortable level so as to prevent overshooting, and that similarly the converse is true if for some reason the compartment has been heated to too high a temperature and it is desired to reduce this temperature by resetting the knob 142.

Having described my invention, what I claim as new and useful and desire to secure by Letters Patent of the United States is:

1. In a control for a hot air heating system having a circuit to control operation of a fuel supply means, the combination comprising a cooperating pair of contacts in said circuit, a first thermostatic means for moving one of said contacts in response to changes in the temperature of the air heated by said heating system, a helical thermostatic element in the space to be heated operatively connected at one end to the second of said contacts to move the latter in response to changes in the temperature of the space being heated toward and from the first contact, means effective to urge said second contact to a predetermined position, means to vary the angular position to which the end of said helical thermostatic element not connected to said contact is held thereby to vary the temperature at which said contacts open and close including a cam follower operatively connected to said helical element for rotating the latter and a spiral cam means rotatable upon an axis independent of the axis of said helical element, means to bias the cam follower against said cam means, and manually operable means for rotating said cam in opposite directions thereby to rock the said one end of said helical element in opposite directions and thus vary the temperature at which the circuit through said contacts is opened, the pitch of said spiral cam being such as to cause rotation of said helical element between its desired maximum and minimum limits with less than one complete revolution of said cam.

2. A control for a hot air heating system having a circuit to control operation of a fuel supply means and vary the rate of combustion between a high and a low point, comprising means forming a casing adapted to be disposed in the space to be heated and having a passageway through which a portion of said heated air may be diverted, a cooperating pair of contacts in said circuit, a first thermostatic means in said passageway for moving one of said contacts linearly in response to the temperature of the heated air, a shaft rockably journaled in said casing, said second contact being fixed upon said shaft and having an arcuate contact surface, the angular position of which determines the amount of said linearly movable contact must move to open and close said circuit, a helical thermostatic element disposed outside said casing in the space to be heated and having one end operatively connected to said shaft, an independent shaft operatively connected to the opposite end of said helical element, means forming a bearing rotatably to support said independent shaft, means to support said bearing-forming means from the casing, said support for said bearing-forming means being formed of a plurality of rigid rods surrounding and extending longitudinally of said helical element, and a flexible strip wrapped around said rods to form a protective cage for said helical element, the convolutions of said wrapped around strip being spaced so that the helical element is exposed to the air in the space to be heated, cooperating cam means to adjust the independent shaft angularly and thereby increase or decrease the tension in said helical element including a first cam means fixed on said independent shaft and a second cam means rotatable upon an axis independent of the axis of said independent shaft, means to bias the latter shaft and the cam fixed thereon in a direction to maintain both of said cams in engagement, and manually operable means for rotating the second cam means in opposite directions thereby to rotate the independent shaft in opposite directions and thus vary the tension in said helical element for thereby varying the temperature at which the circuit through said contacts is opened and closed.

3. A control for a hot air heating system having a circuit to control variation of a fuel supply means and vary the rate of combustion between a high and a low point, comprising means forming a casing adapted to be disposed in the space to be heated, a pair of contacts in said circuit located within said casing, a shaft rotatably journaled in said casing and connected to one of said contacts to move said contacts together and apart with rotation of said shaft, a helical thermostatic element disposed outside said casing in the space to be heated and having one end operatively connected to said shaft, an independent shaft operatively connected to the opposite end of said helical element, means forming a bearing to support said independent shaft, means to support said bearing-forming means from the casing including a plurality of rigid rods surrounding and extending longitudinally of said helical element, a flexible strip wrapped around said rods to form a protective cage for said helical element, the convolutions of said wrapped around strip being spaced so that the helical element is exposed to the air in the space to be heated, and means for adjustably determining the rotational position of said independent shaft.

VERNON N. TRAMONTINI.

REFERENCES CITED

The following references are of record in the file of this patent:

UNITED STATES PATENTS

| Number | Name | Date |
|---|---|---|
| 1,871,093 | Stem | Aug. 9, 1932 |
| 2,025,097 | Dougherty | Dec. 24, 1935 |
| 2,063,613 | McCarthy | Dec. 8, 1936 |
| 2,140,473 | Grant | Dec. 13, 1938 |
| 2,189,382 | McGrath | Feb. 6, 1940 |
| 2,403,917 | Gille | July 16, 1946 |
| 2,425,998 | Crise | Aug. 19, 1947 |
| 2,481,630 | Tramontini | Sept. 13, 1949 |

Certificate of Correction

Patent No. 2,559,810                              July 10, 1951

VERNON N. TRAMONTINI

It is hereby certified that error appears in the printed specification of the above numbered patent requiring correction as follows:

Column 8, line 23, for "tacts" read *contacts*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*